United States Patent
Overby et al.

(10) Patent No.: US 8,294,821 B1
(45) Date of Patent: *Oct. 23, 2012

(54) HDMI CONSUMER ELECTRONICS CONTROL COMMON INTERFACE

(75) Inventors: Mark A. Overby, Bothell, WA (US); Robert William Chapman, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1379 days.

This patent is subject to a terminal disclaimer.

(21) Appl. No.: 11/939,352

(22) Filed: Nov. 13, 2007

(51) Int. Cl.
  H04N 5/44 (2011.01)
  H04N 5/445 (2011.01)
(52) U.S. Cl. ........................ 348/553; 348/563
(58) Field of Classification Search .................. 348/553, 348/563
  See application file for complete search history.

(56) References Cited

U.S. PATENT DOCUMENTS 7,861,017 B2 * 12/2010 Agnihotri et al. ............... 710/60
2009/0125642 A1 * 5/2009 Overby et al. ..................... 710/5

* cited by examiner

Primary Examiner — Kieu Oanh T Bui
(74) Attorney, Agent, or Firm — Patterson & Sheridan, LLP

(57) ABSTRACT

A software or hardware agent running on a personal computing device provides allows application programs to interact with consumer electronic devices using standardized controls. The consumer electronic devices appear to be directly connected to the personal computing device rather than being connected over a high definition multimedia interface (HDMI) network. This enables a user to control the consumer electronic devices using a single interface rather than a separate interface for each consumer electronic device. The agent enumerates a universal serial bus (USB) human interface device (HID) for each consumer electronic device reported on the HDMI network. The USB HIDs represent the specific capabilities of the each one of the consumer electronic devices.

20 Claims, 5 Drawing Sheets

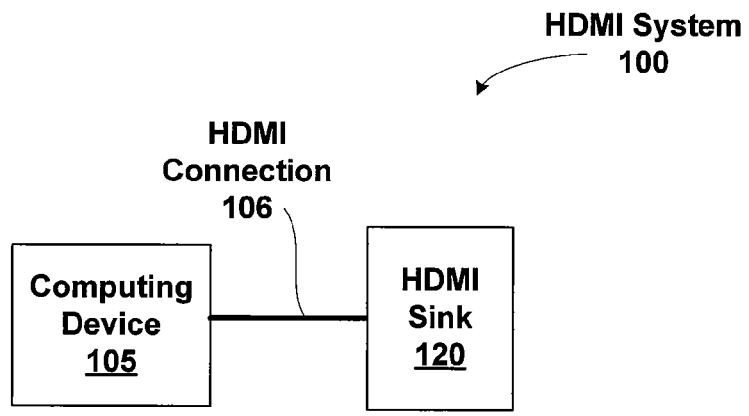
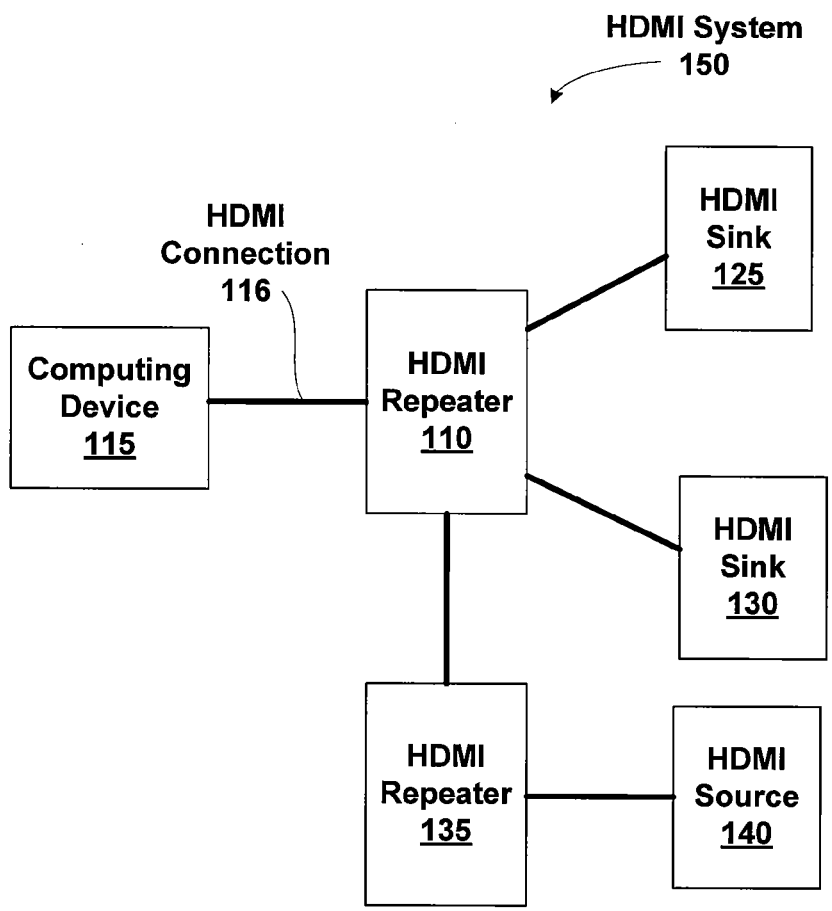
Figure 1A
Figure 1B

HDMI CONSUMER ELECTRONICS CONTROL COMMON INTERFACE

BACKGROUND OF THE INVENTION

1. Field of the Invention

Embodiments of the present invention relate generally to a protocol for controlling consumer electronic devices and, more particularly, to controlling the consumer electronic control devices over a high definition multimedia interface (HDMI) network using a personal computing device.

2. Description of the Related Art

Currently there is no standard interface for controlling consumer electronic devices from a software application running on a personal computing device that is attached to one or more consumer electronic devices by an HDMI network. Consumer electronic devices provide specific controls for a user, such as fast-forward, skip, stop, and play. Typically, the specific controls vary for different vendors of consumer electronic devices. Without a standard interface, users rely on separate interfaces, such as remote controllers, for each consumer electronics device and any personal computing devices attached to the HDMI network. When multiple consumer electronic devices are connected using an HDMI network, it is desirable to use a computing device, such as a personal computer, that is also connected to the HDMI network to control the consumer electronic devices.

Accordingly, what is needed in the art is a system and method for controlling consumer electronic devices over an HDMI network using a personal computing device.

SUMMARY OF THE INVENTION

A software or hardware agent running on a personal computing device provides allows application programs to interact with consumer electronic devices using standardized controls. In particular, the consumer electronic control (CEC) channel that is specified in HDMI 1.2a provides a standard set of controls for consumer electronic devices. The CEC channel allows a user to control multiple consumer electronic devices with a single remote controller and allows consumer electronic devices to control each other. There is no standard interface, such as the CEC channel that allows consumer electronic devices to be controlled by software applications running on a computing device. When the software or hardware agent is used, consumer electronic devices appear to be directly connected to the computing device rather than being connected over an HDMI network. This enables a user to control the consumer electronic devices from the computing device using a single interface rather than a separate interface for each consumer electronic device. The hardware or software agent enumerates a USB HID device for each consumer electronic device reported on the HDMI network. The USB HID represents the specific capabilities of each one of the consumer electronic devices.

Various embodiments of a method of the invention for controlling consumer electronic devices over a high definition multimedia interface (HDMI) network include discovering consumer electronic devices that are coupled to the HDMI network to produce discovered consumer electronic devices and determining control capabilities of each discovered consumer electronic device. Each discovered consumer electronic device is enumerated as a universal serial bus (USB) human interface device (HID) configured to represent the control capabilities. The USB HID for each discovered consumer electronic device is provided using a computing device that is coupled to the HDMI network and configured as a HDMI source device in order to allow a user to control the discovered consumer electronic devices over the HDMI network.

Various embodiments of the invention for a computing device configured to control consumer electronic devices over a high definition multimedia interface (HDMI) network. The computing device includes an agent and an HDMI controller that is coupled to the HDMI network and configured to output commands to the consumer electronic devices. The agent is configured to discover the consumer electronic devices that are coupled to the HDMI network to produce discovered consumer electronic devices, determine control capabilities of each discovered consumer electronic device, enumerate each discovered consumer electronic device as a universal serial bus (USB) human interface device (HID) configured to represent the control capabilities in order to allow a user of the computing device to control the discovered consumer electronic devices over the HDMI network, and translate control commands received by the USB HIDs to produce the commands for output by the HDMI controller.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B are block diagrams illustrating an HDMI system configured to implement one or more aspects of the present invention;

DETAILED DESCRIPTION

Figure 2:
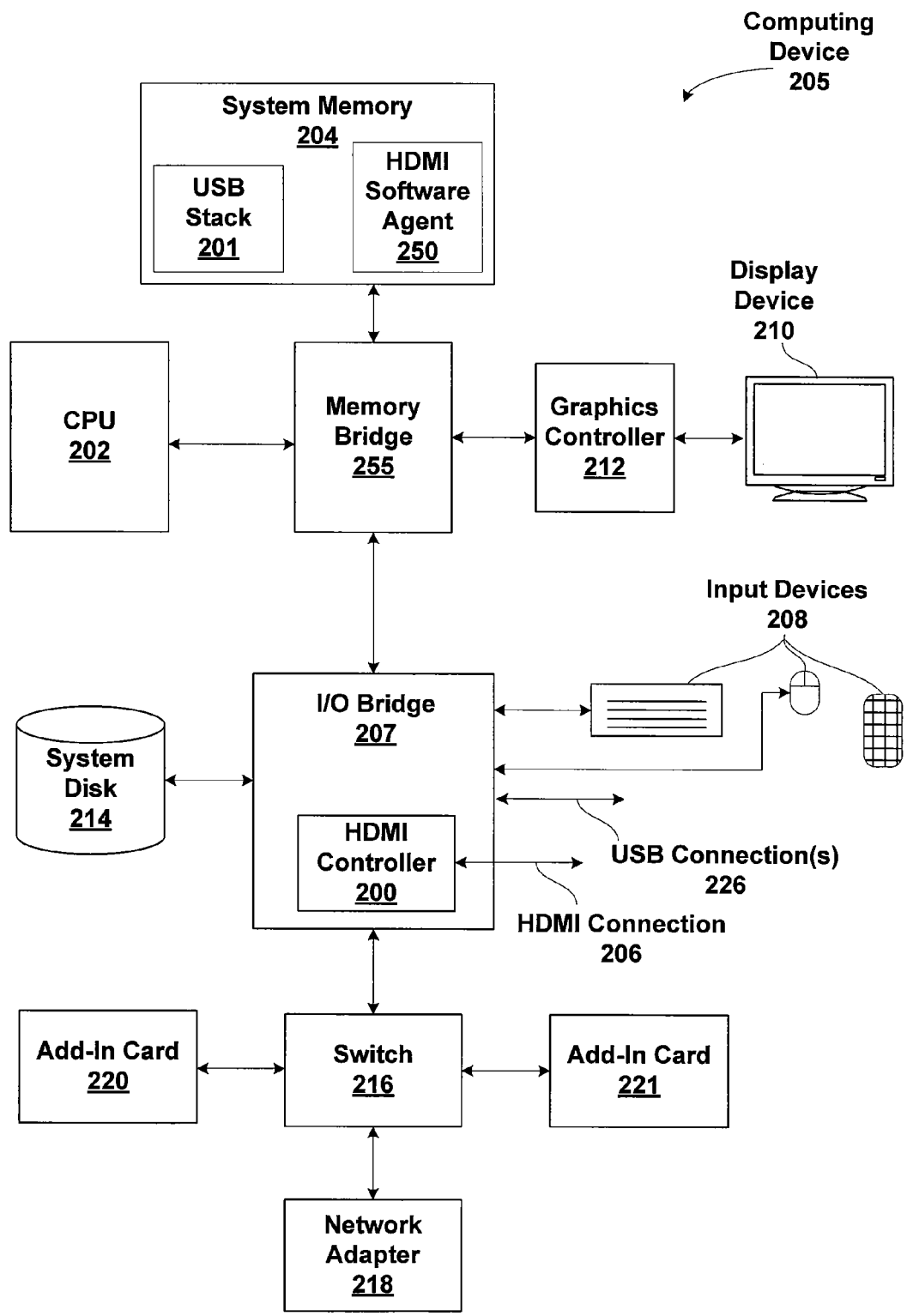
FIG. 2 is a block diagram illustrating the computing device of FIGS. 1A and 1B configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

FIG. 1A is a block diagram illustrating an HDMI system 100 that is configured to implement one or more aspects of the present invention. A computing device 105 is coupled to an HDMI sink 120 through an HDMI network, shown as HDMI connection 106. HDMI sink 120 is a consumer electronic device that conforms to the HDMI interface protocol and is configured to receive device controlling signals and at least one of audio data, visual data, and multimedia data. Consumer electronic devices include, without limitation, a receiver, digital video disc (DVD) player, HDMI repeater, and television. In the preferred embodiment of the present invention, HDMI sink 120 is configured to support the CEC channel to provide a standard audio/visual link protocol. Computing device 105 is described in further detail in conjunction with FIG. 2 and includes, without limitation, a personal computer, desktop computer, server, laptop computer, palm-sized computer, tablet computer, game console, portable wireless terminal such as a PDA or cellular telephone, and computer based simulator.

FIG. 1B is a block diagram illustrating another HDMI system, HDMI system 150 that is configured to implement one or more aspects of the present invention. A computing device 115 is coupled to an HDMI repeater 110 through HDMI connection 116. Additional connections couple HDMI repeater 110 to HDMI sink 125, HDMI sink 130, HDMI repeater 135, and HDMI source 140. HDMI sink 125, HDMI sink 130, and HDMI repeater 135 are consumer electronic devices that conform to the HDMI interface protocol and are configured to receive device controlling signals and at least one of audio data, visual data, and multimedia data. In the preferred embodiment of the present invention, HDMI sink 125, HDMI sink 130, HDMI repeater 135, and HDMI source 140 are configured to support the CEC channel to provide a standard audio/visual link protocol. HDMI source 140 is a consumer electronic device that conforms to the HDMI interface protocol and is configured to output multimedia data, and includes, without limitation, digital video disk players, digital cable set top boxes, satellite TV receivers, and the like. In some embodiments of the present invention, HDMI source 140 is a computing device such as computing device 105 or 115.

An advantage of using an HDMI network to connect the consumer electronic devices and computing device 105 or 115 rather than a wireless network is that the consumer electronic devices may be hidden within or behind furniture and computing device 105 or 115 may be used to control the consumer electronic devices through the HDMI connections.

In FIGS. 1A and 1B, computing devices 105 and 115 are configured to discover all consumer electronic devices in HDMI System 100 and 150, respectively, and enumerate an USB HID for each consumer electronic device. The HID provides a standardized method of communicating status and control points for each capability of the consumer electronic devices. Application programs running on computing device 105 and 115 can interact with and control the consumer electronic devices using standardized controls as if an equivalent device was coupled directly to computing device 105 or 115 via a USB port rather than being connected through HDMI connection 106 or 116.

As previously mentioned, a software or hardware agent translates between USB and standardized controls, such as CEC channel commands. The consumer electronic devices can each be advantageously controlled by computing device 105 or 115 rather than relying on a dedicated control mechanism, e.g., remote control, for each one of the consumer electronic devices. Although a programmable universal remote control may be used, each different consumer electronic device is controlled by configuring the programmable universal remote control to enter a different mode for each consumer electronic device. Furthermore, the programmable universal remote control does not allow for the consumer electronic device to be hidden.

FIG. 2 is a block diagram illustrating a computing device 205 of FIGS. 1A and 1B configured to implement one or more aspects of the present invention. Computing device 205 represents either of computing devices 105 and 115, and includes a central processing unit (CPU) 202 and a system memory 204 communicating via a bus path that includes a memory bridge 255. System memory 204 may include dynamic random access memory (DRAM) or any other appropriate memory technology. Data and program instructions for application programs may be stored in system memory 204 or memory within other devices of system computing device 205. A USB stack 201 is provided as part of a conventional operating system and is executed by CPU 202 to process transactions over USB connection 226. HDMI software agent 250 is configured to interface between consumer electronic devices connected via HDMI connection 206 and USB stack 201, as described in conjunction with FIG. 3A and FIG. 4. In some embodiments of the present invention, HDMI software agent 250 is omitted and the functions of HDMI software agent 250 are performed by circuitry within HDMI controller 200, i.e., a hardware agent, as described in conjunction with FIG. 3B.

Memory bridge 205, which may be, e.g., a Northbridge chip, is connected via a bus or other communication path, e.g., a HyperTransport link, to an I/O (input/output) bridge 207. A graphics controller 212 is coupled to memory bridge 255 via a bus or other communication path, e.g., a PCI Express, Accelerated Graphics Port, or HyperTransport link; in one embodiment graphics controller 212 is a graphics subsystem that delivers pixels to a display device 210, e.g., a conventional CRT or LCD based monitor.

An I/O bridge 207, e.g., a Southbridge chip, receives user input from one or more user input devices 208 (e.g., computer keyboard, wireless remote control, mouse, joystick, trackball, or capacitive input pad) and forwards the input to CPU 202 and memory bridge 255. A system disk 214 is also connected to I/O bridge 207 and may be used to store data, including multimedia content for output to consumer electronic devices via HDMI connection 206. An HDMI controller 200 is included within I/O bridge 207 and provides circuitry to interface between HDMI connection 206 and USB stack 201, as described in conjunction with FIGS. 3A and 3B.

A switch 216 provides connections between I/O bridge 207 and other components such as a network adapter 218 and various add-in cards 220 and 221. Other components (not explicitly shown), including other port connections, CD drives, DVD drives, film recording devices, and the like, may also be connected to I/O bridge 207. Communication paths interconnecting the various components in FIG. 2 may be implemented using any suitable protocols, such as HDMI, USB, PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

It will be appreciated that the computing device shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 255 and CPU 202. In other alternative topologies, graphics controller 212 is connected to I/O bridge 207 or directly to CPU 202, rather than to memory bridge 255. In still other embodiments, two or more of the system components may be incorporated into a single integrated device. For example, I/O bridge 207 and memory bridge 255 might be integrated into a single chip or CPU 220, system controller 218, graphics controller 212 and network adapter 218 may be incorporated into a single integrated device.

The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Consumer Electronic Device Discovery and Enumeration

Figure 3A:
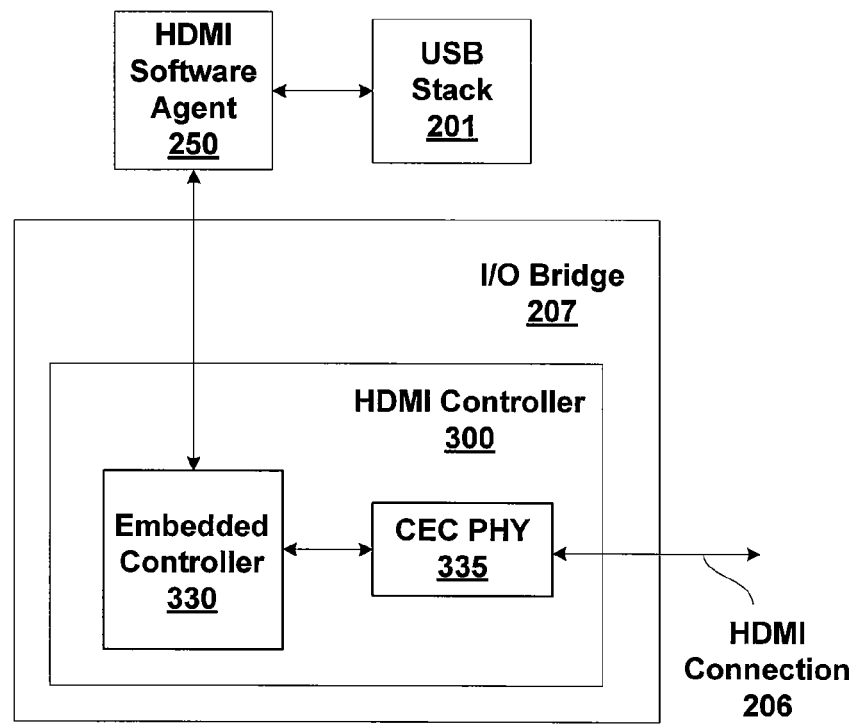
FIG. 3A is a block diagram of a portion of the computing device shown in FIG. 2, including the I/O bridge, HDMI software agent, and USB stack in accordance with one or more aspects of the present invention.

FIG. 3A is a block diagram of a portion of computing device 205 shown in FIG. 2, including I/O bridge 207, HDMI software agent 250, and USB stack 201, in accordance with one or more aspects of the present invention. An HDMI controller 300 includes circuitry for a conventional physical layer, PHY 335 that includes circuitry to interface with HDMI devices via HDMI connection 206. PHY 335 interfaces with an embedded controller 330 that may be implemented using a microprocessor, controller, fixed function logic, or the like. Embedded controller 330 represents the capabilities of the computing device 205 to other devices present on HDMI Connection 206. The capabilities of computing device 205 are provided to embedded controller 330 via communication with HDMI software agent 250. Once discovery is complete, embedded controller 330 stores any transmission received via PHY 335 into a buffer and alerts HDMI software agent 250 of validity of this data. Embedded controller 330 may also take data from a buffer filled by the HDMI software agent 250 and send this data over the HDMI Connection 206 via PHY 335. Typically the transmissions between HDMI software agent 250 and embedded controller 330 will involve standard CEC commands such as fast forward, play, stop, etc. HDMI software agent 250 presents the consumer electronic devices connected to HDMI controller 300 as USB devices, providing a standardized mechanism for controlling each of the consumer electronic devices using computing device 205.

HDMI software agent 250 is custom software that advantageously allows software applications running on computing device 205 using a conventional operating system to control consumer electronic devices. Computing device 205 can be used to control CEC channel controls of any HDMI device connected via HDMI connection 206 by emulating each consumer electronic device as a USB device. The conventional operating system provides USB stack 201, so the application program may run without any modification and control the consumer electronic devices through computing device 205.

Figure 3B:
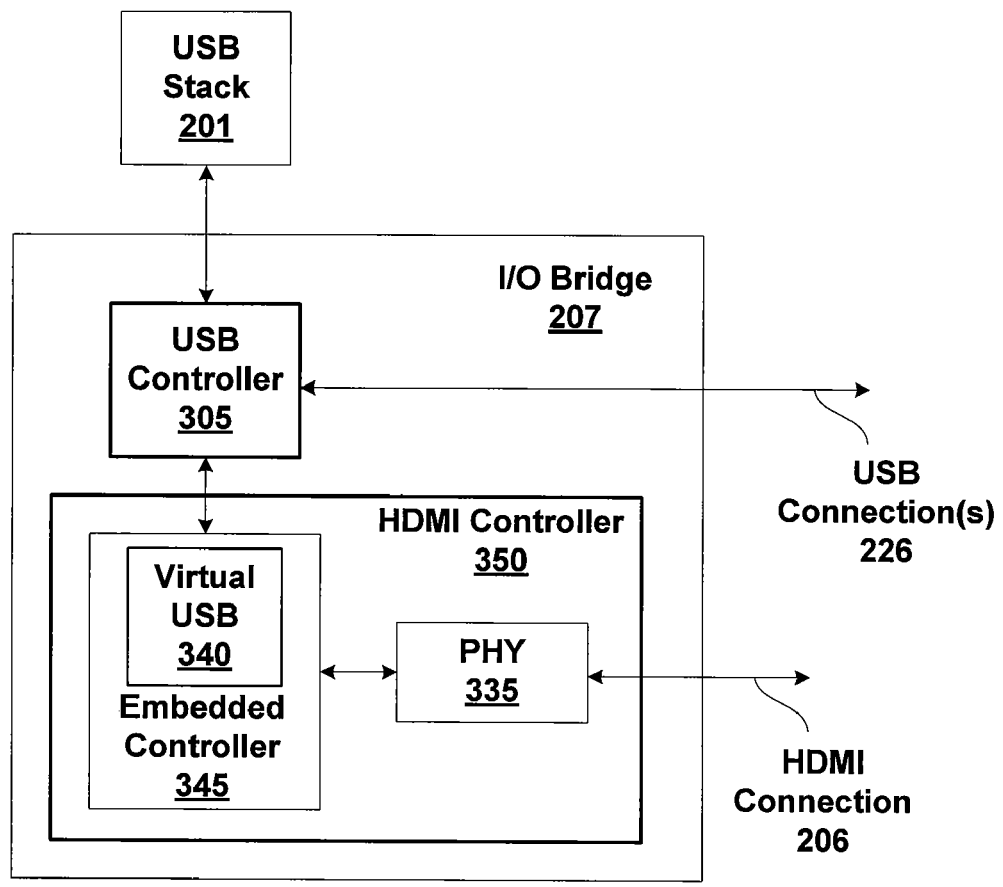
FIG. 3B is a block diagram of a portion of the computing device shown in FIG. 2, including the I/O bridge and USB stack in accordance with one or more aspects of the present invention.

FIG. 3B is a block diagram of a portion of computing device 205 shown in FIG. 2, including I/O bridge 207 and USB stack 201, in accordance with one or more aspects of the present invention. In this embodiment of the present invention, the functionality provided by HDMI software agent 250 is provided by a virtual USB 340 within an embedded controller 345. Like HDMI controller 300, HDMI controller 350 includes PHY 335 to interface with consumer electronic devices via HDMI connection 206. Embedded controller 345 performs the functions of embedded controller 330, and additionally, virtual USB 340 presents the controls of the HDMI network devices connected to HDMI controller 350 to a USB controller 305 as USB HIDs. Conventional USB controller 305 provides a USB interface for USB connection(s) 226 and is connected to embedded controller 345 using a USB interface.

Virtual USB 340 appears to USB controller 305 as another USB connection, to which one or more consumer electronic devices are coupled. USB controller 305 interfaces with USB stack 201 to allow a software application executing on computing device 205 to control the HDMI devices connected via HDMI connection 206. HDMI software agent 250 or virtual USB 340 each emulate the controls of the consumer electronic devices connected via HDMI connection 206 as USB-based human interface devices to allow computing device 205 to control the devices over an HDMI network. The controls of any consumer electronics device that complies with a standard, such as the CEC channel of HDMI 1.3, can be enumerated and controlled by a computing device that includes HDMI software agent 250 or virtual USB 340.

Figure 4:
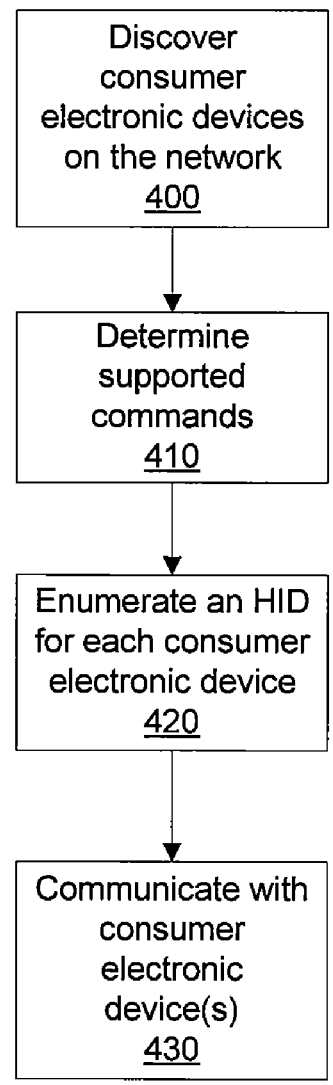
FIG. 4 is a flow diagram of method steps for configuring an HDMI system for control by a computing device in accordance with one or more aspects of the present invention.

FIG. 4 is a flow diagram of method steps for configuring HDMI system 100 and 150 for control by computing device 205, in accordance with one or more aspects of the present invention. In step 400 HDMI software agent 250 or virtual USB 340 discovers any consumer electronic devices on the HDMI network, i.e., consumer electronic devices connected to computing system 205 via HDMI connection 206. In step 410 HDMI software agent 250 or virtual USB 340 determines the specific control capabilities, e.g., CEC channel controls, supported by each one of the consumer electronic devices discovered in step 400. For example, each consumer electronic device may use one or more of the user commands, e.g., play, fast-forward, skip, stop, and the like, specified by a standard, such as the CEC channel. In step 420 HDMI software agent 250 or virtual USB 340 enumerates a USB HID for each one of the consumer electronic devices. The enumerated HIDs provide a standardized method of communicating status and CEC channel controls for each control capability determined in step 410.

The consumer electronic devices appear to software applications as if the consumer electronic devices are USB devices connected directly to computing device 205 rather than as consumer electronic devices connected via an HDMI network. In step 430 one or more software applications running on computing device 205 interact with the consumer electronic devices using controls, e.g., CEC channel controls, that are specific to each consumer electronic device. Therefore, a user may control one or more of the HDMI networked devices or other computing devices (HDMI sources) through a single input device, e.g., remote control, provided by computing device 205. Alternatively, a user may control one or more of the HDMI networked consumer electronic devices or other computing devices (HDMI sources) through a graphical user interface displayed on display device 210. Furthermore, since consumer electronic devices are hot pluggable, HDMI software agent 250 and virtual USB 340 detect when a consumer electronic device is added or removed from HDMI system 100 or 150. Steps 400, 410, 420, and 430 are completed when a consumer electronic device is added and USB HIDs for removed consumer electronic devices are disabled.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory)

on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for controlling consumer electronic devices over a high definition multimedia interface (HDMI) network, comprising:
    discovering consumer electronic devices that are coupled to the HDMI network to produce discovered consumer electronic devices;
    determining control capabilities of each discovered consumer electronic device;
    enumerating each discovered consumer electronic device as a universal serial bus (USB) human interface device (HID) configured to represent the control capabilities; and
    providing the USB HID for each discovered consumer electronic device using a computing device that is coupled to the HDMI network and configured as a HDMI source device in order to allow a user to control the discovered consumer electronic devices over the HDMI network.

2. The method of claim 1, further comprising the steps of:
    detecting an additional consumer electronic device that has been connected to the HDMI network while the computing device is operating;
    determining control capabilities of the additional consumer electronic device;
    enumerating the additional consumer electronic device as an additional USB HID that is configured to represent the control capabilities of the additional consumer electronic device; and
    providing the additional USB HID using the computing device that is coupled to the HDMI network and configured as a HDMI source device in order to allow the user to control the additional consumer electronic device over the HDMI network.

3. The method of claim 1, further comprising the steps of:
    detecting a first consumer electronic device of the discovered consumer electronic devices has been removed from the HDMI network while the computing device is operating; and
    disabling the USB HID for the first consumer electronic device.

4. The method of claim 1, wherein a single wireless remote control is used to allow a user to interface with the computing device to control the discovered consumer electronic devices over the HDMI network.

5. The method of claim 1, wherein a graphical user interface is presented on a display device of the computing device to allow a user to control the discovered consumer electronic devices over the HDMI network.

6. The method of claim 1, wherein the consumer electronic devices implement a consumer electronic control (CEC) channel specified by HDMI 1.2a.

7. The method of claim 1, wherein the consumer electronic devices are configured as HDMI sinks that receive device controlling signals and at least one of audio data, visual data, and multimedia data.

8. The method of claim 1, further comprising the steps of:
    receiving a user input command from one of the USB HIDs; and
    translating the USB command received by the computing device into a CEC packet for output to a first device of the discovered consumer electronics devices to control the first device.

9. A computer readable medium storing instructions for causing a computing device to control consumer electronic devices over a high definition multimedia interface (HDMI) network by performing the steps of:
    discovering consumer electronic devices that are coupled to the HDMI network to produce discovered consumer electronic devices;
    determining control capabilities of each discovered consumer electronic device;
    enumerating each discovered consumer electronic device as a universal serial bus (USB) human interface device (HID) configured to represent the control capabilities; and
    providing the USB HID for each discovered consumer electronic device using a computing device that is coupled to the HDMI network and configured as a HDMI source device in order to allow a user to control the discovered consumer electronic devices over the HDMI network.

10. The computer readable medium of claim 9, further comprising the steps of:
    receiving a user input command from one of the USB HIDs; and
    translating the USB command received by the computing device into a CEC packet for output to a first device of the discovered consumer electronics devices to control the first device.

11. The computer readable medium of claim 9, wherein the consumer electronic devices implement a consumer electronic control (CEC) channel specified by HDMI 1.2a.

12. A computing device configured to a control consumer electronic devices over a high definition multimedia interface (HDMI) network, the computing device comprising:
    an HDMI controller that is coupled to the HDMI network and configured to output commands to the consumer electronic devices; and
    an agent configured to:
        discover the consumer electronic devices that are coupled to the HDMI network to produce discovered consumer electronic devices;
        determine control capabilities of each discovered consumer electronic device;
        enumerate each discovered consumer electronic device as a universal serial bus (USB) human interface device (HID) configured to represent the control capabilities in order to allow a user of the computing device to control the discovered consumer electronic devices over the HDMI network; and
        translate control commands received by the USB HIDs to produce the commands for output by the HDMI controller.

13. The system of claim 12, wherein the computing device further comprises a system memory configured to store the agent and a USB stack, and the agent is a software program configured to interface between the USB stack and the HDMI controller.

14. The system of claim 12, wherein the computing device further comprises a USB controller, and the agent is a virtual USB that is coupled to the USB controller and configured to interface between the USB controller and the HDMI controller.

15. The system of claim 12, wherein the agent is further configured to:
- detect an additional consumer electronic device that has been connected to the HDMI network while the computing device is operating;
- determine control capabilities of the additional consumer electronic device;
- enumerate the additional consumer electronic device as an additional USB HID that is configured to represent the control capabilities of the additional consumer electronic device; and
- provide the additional USB HID using the computing device in order to allow the user to control the additional consumer electronic device over the HDMI network.

16. The system of claim 12, wherein the computing device is configured as a HDMI source device.

17. The system of claim 12, wherein the agent is further configured to:
- detect a first consumer electronic device of the discovered consumer electronic devices has been removed from the HDMI network while the computing device is operating; and
- disable the USB HID for the first consumer electronic device.

18. The system of claim 12, wherein the computing device further comprises a single wireless remote control configured to allow a user to interface with the computing device to control the discovered consumer electronic devices over the HDMI network.

19. The system of claim 12, wherein the computing device further comprises a display device that is configured to present a graphical user interface to allow a user to control the discovered consumer electronic devices over the HDMI network.

20. The system of claim 12, wherein the consumer electronic devices implement a consumer electronic control (CEC) channel specified by HDMI 1.2a.

* * * * *